(12) United States Patent
Ellsworth

(10) Patent No.: US 8,645,840 B2
(45) Date of Patent: Feb. 4, 2014

(54) MULTIPLE USER GUI

(75) Inventor: Matthew R. Ellsworth, Erie, CO (US)

(73) Assignee: Avaya Inc., Basking Ridge, NJ (US)

( * ) Notice: Subject to any disclaimer, the term of this patent is extended or adjusted under 35 U.S.C. 154(b) by 402 days.

(21) Appl. No.: 12/795,127

(22) Filed: Jun. 7, 2010

(65) Prior Publication Data
US 2011/0047478 A1  Feb. 24, 2011

Related U.S. Application Data

(60) Provisional application No. 61/235,838, filed on Aug. 21, 2009.

(51) Int. Cl.
*G06F 3/0482* (2013.01)

(52) U.S. Cl.
USPC ........... 715/747; 715/758; 715/764; 715/728; 715/737; 709/203; 709/204; 709/217; 348/14.1

(58) Field of Classification Search
USPC .......................................................... 715/747
See application file for complete search history.

(56) References Cited

U.S. PATENT DOCUMENTS

| | | | | |
|---|---|---|---|---|
| 5,875,240 | A * | 2/1999 | Silverman ................. | 379/142.07 |
| 6,396,506 | B1 * | 5/2002 | Hoshino et al. ............... | 345/650 |
| 6,850,496 | B1 | 2/2005 | Knappe et al. | |
| 6,931,596 | B2 * | 8/2005 | Gutta et al. .................... | 715/728 |
| 6,934,376 | B1 * | 8/2005 | McLaughlin et al. ... | 379/212.01 |
| 7,102,119 | B1 | 9/2006 | Breslow et al. | |
| 7,171,473 | B1 | 1/2007 | Eftis et al. | |
| 7,295,663 | B2 * | 11/2007 | McLaughlin et al. ... | 379/212.01 |
| 7,360,174 | B2 * | 4/2008 | Grossman et al. ............ | 715/854 |
| 7,369,538 | B1 * | 5/2008 | Ehlinger et al. .............. | 370/352 |
| 7,634,533 | B2 * | 12/2009 | Rudolph et al. .............. | 709/203 |
| 7,712,041 | B2 * | 5/2010 | Toyama et al. ............... | 715/778 |
| 7,739,210 | B2 * | 6/2010 | Horvitz et al. .................. | 706/21 |
| 7,739,246 | B2 * | 6/2010 | Mooney et al. ............... | 707/687 |
| 7,843,486 | B1 * | 11/2010 | Blair et al. .................. | 348/14.01 |
| 8,244,851 | B1 * | 8/2012 | Postoaca ....................... | 709/223 |
| 2002/0149613 | A1 * | 10/2002 | Gutta et al. ................... | 345/728 |
| 2002/0191071 | A1 * | 12/2002 | Rui et al. ................... | 348/14.03 |
| 2004/0008423 | A1 * | 1/2004 | Driscoll et al. ............... | 359/725 |

(Continued)

FOREIGN PATENT DOCUMENTS

| | | |
|---|---|---|
| EP | 1070522 | 1/2001 |
| EP | 2085865 | 8/2009 |

(Continued)

OTHER PUBLICATIONS

Day et al., "RFC 2778: A Model for Presence and Instant Messaging," Network Working Group Request for Comments 2778, Internet Engineering Task Force, Feb. 2000, pp. 1-16.

(Continued)

*Primary Examiner* — William Bashore
*Assistant Examiner* — Reza Nabi
(74) *Attorney, Agent, or Firm* — Sheridan Ross, P.C.

(57) ABSTRACT

Mechanisms are provided herein which accommodate the sharing of a user device among multiple users. In particular, when multiple users are detected as sharing a user device, the user interface of the user device can be automatically altered to facilitate the sharing of the user device. Data associated with each sharing user may also be presented according to each user's presentation preferences and to accommodate presentation needs of each user.

16 Claims, 3 Drawing Sheets

(56) References Cited

U.S. PATENT DOCUMENTS

| | | | |
|---|---|---|---|
| 2004/0119760 A1* | 6/2004 | Grossman et al. | 345/854 |
| 2005/0018828 A1 | 1/2005 | Nierhaus et al. | |
| 2005/0206721 A1 | 9/2005 | Bushmitch et al. | |
| 2005/0207556 A1 | 9/2005 | Gonzalez et al. | |
| 2006/0058049 A1* | 3/2006 | McLaughlin et al. | 455/466 |
| 2006/0085483 A1* | 4/2006 | Mooney et al. | 707/200 |
| 2006/0093117 A1 | 5/2006 | Agrawal et al. | |
| 2006/0093121 A1 | 5/2006 | Sylvain | |
| 2006/0116115 A1 | 6/2006 | Lee | |
| 2006/0136224 A1 | 6/2006 | Eaton et al. | |
| 2006/0161853 A1* | 7/2006 | Chen et al. | 715/758 |
| 2006/0177034 A1 | 8/2006 | Reding et al. | |
| 2006/0184584 A1* | 8/2006 | Dunn et al. | 707/200 |
| 2006/0193460 A1 | 8/2006 | Cadiz et al. | |
| 2007/0061702 A1* | 3/2007 | Letkeman | 715/511 |
| 2007/0067443 A1 | 3/2007 | Seligmann et al. | |
| 2007/0127669 A1* | 6/2007 | Shields | 379/202.01 |
| 2007/0133774 A1* | 6/2007 | Fujimoto | 379/202.01 |
| 2007/0143791 A1* | 6/2007 | Sammarco | 725/38 |
| 2007/0156908 A1* | 7/2007 | Szomolanyi et al. | 709/227 |
| 2007/0239828 A1* | 10/2007 | Patton et al. | 709/204 |
| 2007/0268130 A1* | 11/2007 | Yee et al. | 340/540 |
| 2007/0294120 A1 | 12/2007 | Berstis et al. | |
| 2007/0294632 A1* | 12/2007 | Toyama et al. | 715/764 |
| 2008/0125104 A1* | 5/2008 | You et al. | 455/418 |
| 2008/0275941 A1 | 11/2008 | Shekar et al. | |
| 2008/0300852 A1* | 12/2008 | Johnson et al. | 704/2 |
| 2009/0006972 A1* | 1/2009 | Karlson et al. | 715/737 |
| 2009/0165090 A1* | 6/2009 | Glasgow | 726/3 |
| 2010/0040215 A1 | 2/2010 | Gupta et al. | |
| 2010/0180210 A1* | 7/2010 | Toyama et al. | 715/750 |
| 2010/0211636 A1 | 8/2010 | Starkenburg et al. | |
| 2011/0044444 A1* | 2/2011 | Abramson | 379/207.02 |
| 2011/0047242 A1* | 2/2011 | Sinha | 709/217 |
| 2011/0055234 A1* | 3/2011 | Miettinen | 707/755 |
| 2011/0106954 A1* | 5/2011 | Chatterjee et al. | 709/227 |
| 2011/0179139 A1 | 7/2011 | Starkenburg et al. | |
| 2011/0193810 A1* | 8/2011 | Park et al. | 345/173 |
| 2011/0249078 A1* | 10/2011 | Abuan et al. | 348/14.02 |
| 2011/0249086 A1* | 10/2011 | Guo et al. | 348/14.12 |
| 2011/0320957 A1* | 12/2011 | Tiddens | 715/747 |
| 2012/0092440 A1* | 4/2012 | Cho et al. | 348/14.07 |
| 2012/0156674 A1* | 6/2012 | Finkelstein et al. | 435/6.11 |
| 2012/0330896 A1* | 12/2012 | Runstedler et al. | 707/634 |
| 2013/0022038 A1* | 1/2013 | Cadiz et al. | 370/352 |

FOREIGN PATENT DOCUMENTS

| | | |
|---|---|---|
| KR | 10-2005-0063413 | 6/2005 |
| KR | 10-2005-0075310 | 7/2005 |
| KR | 10-0739747 | 7/2007 |
| WO | WO 02/071315 | 9/2002 |

OTHER PUBLICATIONS

International Search Report for International (PCT) Patent Application No. PCT/US2010/044122, mailed Apr. 28, 2011.

Written Opinion (PCT) Patent Application No. PCT/US2010/044122, mailed Apr. 28, 2011.

International Search Report for International (PCT) Patent Application No. PCT/US2010/044391, mailed Apr. 1, 2011.

Written Opinion (PCT) Patent Application No. PCT/US2010/044391, mailed Apr. 1, 2011.

International Preliminary Report on Patentability for International (PCT) Patent Application No. PCT/US2010/044122, mailed Mar. 1, 2012 6 pages.

International Preliminary Report on Patentability for International (PCT) Patent Application No. PCT/US2010/044391, mailed Mar. 1, 2012 6 pages.

Official Action for U.S. Appl. No. 12/861,623, mailed Feb. 2, 2012 23 pages.

Extended European Search Report for European Patent Application No. 10173711.2, dated Oct. 26, 2012 11 pages.

Linzmayer "Joust comes home: Lancer and Clash for the color computer," Creative Computing, Oct. 1983, vol. 9, No. 10, pp. 1-4.

Search Report for European Patent Application No. 10173711.2, dated Jul. 5, 2012 8 pages.

Official Action for U.S. Appl. No. 12/861,623, mailed Aug. 30, 2012 23 pages.

Official Action for U.S. Appl. No. 12/837,312, mailed Oct. 3, 2012 16 pages.

Official Action for U.S. Appl. No. 12/837,312, maield Feb. 1, 2013 18 pages.

Official Action for U.S. Appl. No. 12/861,623, mailed Jul. 3, 2013 25 pages.

Official Action for U.S. Appl. No. 12/837,312, mailed Jun. 21, 2013 19 pages.

\* cited by examiner

MULTIPLE USER GUI

CROSS-REFERENCE TO RELATED APPLICATIONS

This application claims the benefit of U.S. Provisional Application No. 61/235,838, filed Aug. 21, 2009, the entire disclosure of which is hereby incorporated herein by reference.

FIELD OF THE INVENTION

The present invention is generally directed toward user interfaces and more specifically toward controlling user interfaces on computing and communication devices.

BACKGROUND

Most phones, computers, televisions, and similar user devices are currently designed to be used by a single user. This design limitation is not consistent with many intended uses of such user devices. In particular, many use cases exist whereby one user desires to share their user device with another user device. Such use cases exist in business environment as well as the personal-use environment.

As one exemplary use case, two or more co-workers may have scheduled a conference call with a third user. The co-workers may decide to meet at one of the co-worker's offices and share the user device within that office. While some phones are provided with a speaker phone capability to facilitate use by multiple users, no other features of the phone are altered to accommodate multiple users. Moreover, no multiple-user feature of the phone is known to automatically react to the presence of two or more users within proximity of a common user device.

As another exemplary use case, two or more friends may decide to watch a movie or television show on a single user device. While some televisions provide a picture-in-picture function, this function has to be manually invoked by one of the users. There is no currently known capability of the user device to detect that it is being utilized by multiple users and automatically alter its interface to accommodate the multiple user utilization.

SUMMARY

It is with respect to the above issues and other problems that the embodiments presented herein were contemplated. Embodiments of the present invention proposed herein provide one or more mechanisms which allow a user device to automatically and/or manually identify that multiple users are sharing that device (e.g., by detecting that multiple users are in proximity to the user device). Examples of such automated mechanisms include facial recognition technologies, SIM card detection (e.g., detect cell phones or mobile communication devices of multiple users by establishing a bluetooth or similar wireless association with the mobile devices of the users), Radio Frequency Identification (RFID) detection technologies, and the like. As noted above, manual user input may also be utilized to determined that multiple users are present and utilizing a common user device. Other presence-aware mechanisms may also be used without departing from the scope of the present invention.

Once the user device detects the presence of multiple users, the user device may then invoke certain features for enhancing shared use of the user device. More specifically, the user device may alter its user interface to facilitate efficient simultaneous multi-user use.

In accordance with at least some embodiments, a method, device, and system is provided to alter the look, control, features or operational preferences of a user device, such as a telephony device, with a graphical user interface when two or users parties are collaborating together in proximity of the device. There are numerous use cases that can be envisioned.

For example, a Graphical User Interface (GUI) of the user device may render a split screen view for each participant detected in front of the user device. If two users are detected as sharing the device, then the GUI area may be split in half. If three users are detected as sharing the device, then the GUI area may be split in thirds. If four users are detected as sharing the device, then the GUI may be split in fourths and so on. If the number of users is too large such that the mere GUI area of the user interface would be inefficient (e.g., because the display in any given frame would be too small to be read or be useful), then the GUI may adapt one or more controls (e.g., soft buttons) of the user device to allow users to toggle between the different view screens or certain split-screen combinations.

In some embodiments, an intelligent manipulation of user interface objects may be manipulated to accommodate the multiple users. As one example, the user device may retrieve a contact list for each of the users detected in proximity to the user device. The user device may then create a merged or "combined contacts" list that is displayed via the GUI. In some embodiments, the combined contacts may only include contacts that are found in each of the individual contact lists of all detected users. In some embodiments, all of the contacts from both lists may be included in the combined contacts. In some embodiments, the contacts in the combined contacts may be re-ordered according to the number of contact lists in which that contact resides (e.g., if a contact is found in three contact lists for three users it may be positioned higher in the combined contact list than a contact found in only two of the three contact lists and both of those contacts may be positioned higher in the combined contact list than a contact found in only one of the three contact lists).

The context of the collaboration around the user device can also be used as an input factor in determining how to organize, merge, and display information associated with the different users. For instance, the user device may be capable of recognizing that the three users sharing the user device (or two users sharing a user device to engage in a communication session with a third participant on a far-end user device) are part of a team working on a particular project. Based on this determination, the user device may gather other contacts in that team working on the project as well as any emails or recent communications between the users which are found to be possibly related to the project; these communications may be rendered for display on the user device to facilitate collaboration. Accordingly, the ability to isolate commonalities or differences between the two halves of the screen can also be provided as an alternative to a pure split-screen embodiment.

It may also be possible in some embodiments to remove content from the GUI when multiple users are detected. For example, if a first user has some information marked as sensitive or private, then that information may be redacted or hidden from view on the GUI when the presence of another user is detected.

This intelligent combining of user documents, preferences, lists, communications, or the like could extend to any application, document, list, or the like. For instance, each user may be working on different versions of the same document and then may meet at a single user device to collaborate on their work. The user device may recognize that multiple users are present in front of the device, may further recognize that a particular document is being opened, and may further retrieve the different versions that were being worked on by both or all users. The user device may then automatically create a third merged document showing differential changes made by each user. Alternatively, or in addition, the split screen embodiment may be employed to simultaneously display each user's version of the document during collaboration.

Combinations of the above-described user interface-manipulation techniques may also be implemented without departing from the scope of the present invention.

In accordance with at least some embodiments of the present invention, a method is provided that generally comprises:

detecting two or more users sharing a user device; and in response to detecting the two or more users sharing the user device, altering a property of a user interface of the user device to accommodate a simultaneous use of the user device by the detected two or more users.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the invention is considered to include a tangible storage medium and prior art-recognized equivalents and successor media, in which the software implementations of the present invention are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
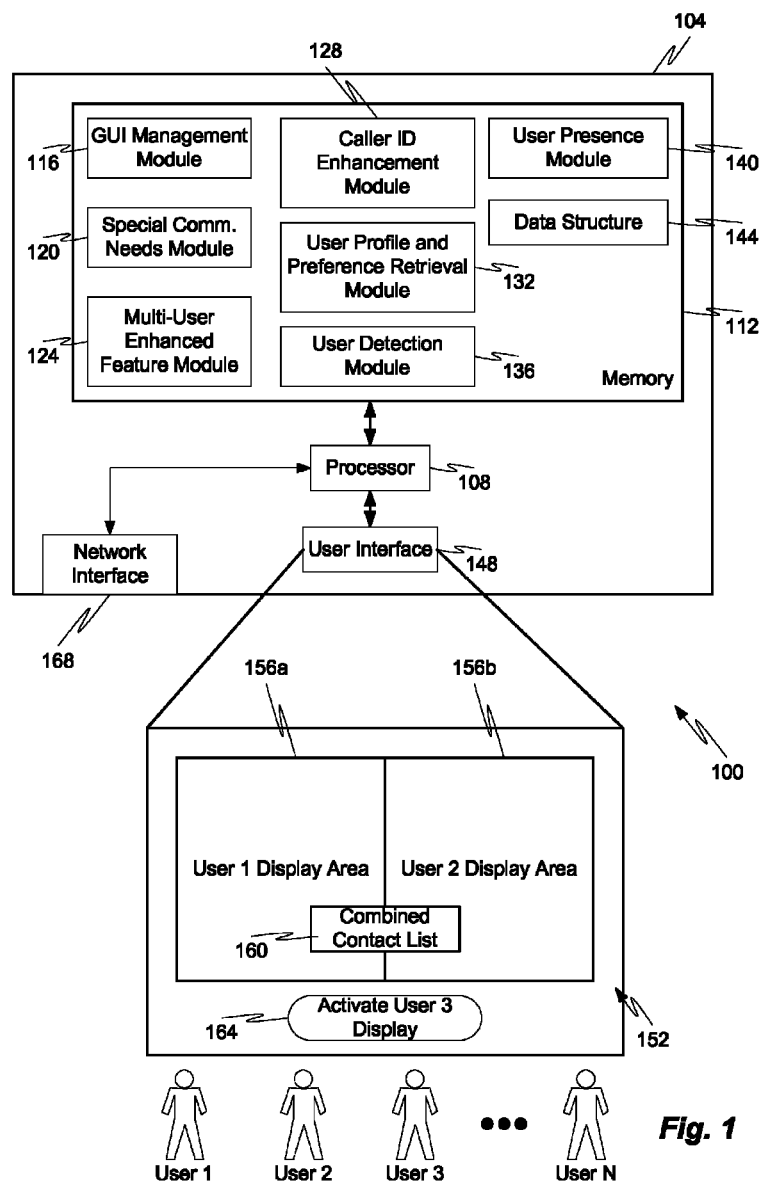
FIG. 1 is a block diagram of a communication system in accordance with embodiments of the present invention.

A communication system 100 including a user device 104 capable of accommodating utilization by multiple users is shown in FIG. 1. The depicted user device 104 includes a processor 108, a memory 112, a user interface 148, and a network interface 168.

The user interface 148 may include a user input and/or user output device. The user interface 148 enables a user or multiple users to interact with the user device 104. Exemplary user input devices which may be included in the user interface 148 comprise, without limitation, a microphone, a button, a mouse, trackball, rollerball, or any other known type of user input device. Exemplary user output devices which may be included in the user interface 148 comprise, without limitation, a speaker, light, Light Emitting Diode (LED), display screen, buzzer, or any other known type of user output device. In some embodiments, the user interface 148 includes a combined user input and user output device such as a touch-screen.

In some embodiments, the user interface 148 comprises a display area 152 that may be split into two or more user-specific display areas 156*a*, 156*b*. These user-specific display areas allow each user utilizing the user device 104 to have a portion of user interface 148 dedicated to them. In some embodiments, it may be useful to combine a display to accommodate multiple users. As one example, the display area 152 may present a combined image or set of images, such as a combined contact list 160. Other types of multi-user displays may be utilized to accommodate multiple users. For example, the combined image may comprise a merged document that is a combination of each users' individual versions of the same document.

As can be appreciated, if too many users are sharing the user device 104, it may be difficult to afford each user his/her own display area. In such instances a toggle input 164 may be dynamically generated on the display area 152 that allows the users to toggle through display types and preferences. In some embodiments, pressing the toggle input 164 may cause one user's display area to be replaced with another user's display area. In some embodiments, pressing the toggle input 164 may cause a combined image to be presented if such an image was previously not presented (or disappear if such an image was previously presented). Other display functions described herein may also be accessed by the toggle input 164.

Although only a single toggle input 164 is depicted, one skilled in the art will appreciate that multiple toggle inputs 164 may be presented without departing from the scope of the present invention. In some embodiments, the toggle input 164 corresponds to a hard-key specifically provisioned on the user interface 148 as a button. In some embodiments, the toggle input 164 corresponds to a soft-key that is dynamically provisioned on an as-needed basis.

The processor 108 may include a microprocessor, Central Processing Unit (CPU), a collection of processing units capable of performing serial or parallel data processing functions, and the like.

The memory 112 may include a number of applications or executable instructions that are readable and executable by the processor 108. For instance, the memory 112 may include instructions in the form of one or more modules and/or applications. The memory 112 may also include data and rules in the form of one or more data structures 144 which can be used by one or more of the modules and/or applications. Exemplary applications include an operating system and various other applications. The operating system is a high-level application which enables the various other applications and modules to interface with the hardware components (e.g., processor 108, network interface 168, and user interface 148) of the user device 104. The operating system also enables a user or users of the user device 104 to view and access the applications and modules in memory 112 as well as data structures 144 contained in memory 112.

Although the applications and modules are depicted as software instructions residing in memory 112 and those instructions are executable by the processor 108, one skilled in the art will appreciate that the applications and modules may be implemented partially or totally as hardware or firmware. For example, an Application Specific Integrated Circuit (ASIC) may be utilized to implement some or all of the functionality discussed herein.

Exemplary features offered by the applications include, without limitation, communication features (e.g., voice communication applications, text communication applications, video communication applications, multimedia communication applications, etc.), web-browsing features, word-processing features, and so on. Specific modules which may be included in memory 112 include, without limitation, a GUI management module 116, a special communication needs module 120, a multi-user enhanced feature module 124, a data presentation enhancement module 128, a user profile and preference retrieval module 132, a user detection module 136, and a user presence module 140.

The GUI management module 116 may provide the user device 104 with the functionality for managing, manipulating, and/or controlling the user interface 148. In particular, the GUI management module 116 may be configured to automatically adapt properties of the user interface 148 when multiple users are determined to be using or potentially using the user device 104 at the same time.

The special communication needs module 120 may be provided to accommodate special communication needs of a user if such a user is detected as using the user device 104. For example, the special communication needs module 120 may operate in conjunction with the GUI management module 116 to further alter the user interface 148 if one or more users with special needs are detected as using the user device 104. Exemplary types of special needs users that may be accommodated by the special communication needs module 120 include, without limitation, sight-impaired users, color-blind users, hearing-impaired users, speech-impaired users, and combinations thereof. As a non-limiting example, the special communication needs module 120 may operate in conjunction with the GUI management module 116 to alter a some or all of the user interface 148 to accommodate two users where one user requires a TTY machine and the other does not. As another non-limiting example, the special communication needs module 120 may operate in conjunction with the GUI management module 116 to alter some or all of the user interface 148 to accommodate two users where one user is color blind and the other is not.

The multi-user enhanced feature module 124 may be provided as the module which interfaces the user detection module 136 and the GUI management module 116. In particular, the multi-user enhanced feature module 124 may be configured to automatically invoke the GUI management module 116 when multiple users are detected as sharing the user device 104 or when the population of users around the user device 104 changes. The multi-user enhanced feature module 124 may also be configured to determine the types of user interface 148 manipulations which are allowable (e.g., based on user rules or operating rules contained in the data structure 144) and enforce those rules as needed.

The data presentation enhancement module 128 is a module which is specially configured to alter caller ID, contact lists, collaboration documents, and other text-based presentations of data via the user interface 148. The data presentation enhancement module 128 may be configured to analyze the profiles, permissions, and other forms of data structures 144 associated with various users detected within proximity of the user device 104 and combine such data for convenient display via the user interface 148. In some embodiments, the data presentation enhancement module 128 may also be configured to determine a context associated with multiple users sharing the user device 104 and retrieve data based on the determined context as well as condition the data for display via the user interface 148 in accordance with the determined context.

The user profile and preference retrieval module 132 is designed to retrieve the necessary profile and preference information for the users sharing the user device 104. In some embodiments, the user profile and preference retrieval module 132 is configured to determine the identity of each user sharing the user device 104, determine a location where each user's profile and preference information is maintained (e.g., in an enterprise database, in a remote data-storage directory, within the user device 104, or on another user device), and retrieve such information. The user profile and preference retrieval module 132 may also be configured to format the data which it retrieves into the data structures 144 such that it can be used by the other modules in memory 112.

The user detection module 136 provides the user device 104 with the ability to detect one or more users within proximity of the user device 104 or actually sharing use of the user device 104. Although the user detection module 136 is depicted solely as residing in memory 112, one skilled in the art will appreciate that dedicated hardware components can also be provided to execute the user detection module 136. For example, if RFID detection methods are employed to detect the presence of a user within proximity of the user device 104, then known RFID hardware components (e.g., antennas, integrated circuits, Near Field Communications (NFC)-enabling components, etc.) may also be provided in the user device 104. As another example, the user detection module 136 may also employ a camera if facial recognition is being utilized to detect multiple users sharing the user device 104. However, the user detection module 136 as depicted may be configured to receive input from some other user-detection device and determine, based on that input, that multiple users are sharing the user device 104. In some embodiments, the user detection module 136 is capable of detecting multiple users through multiple logins or a single combined login. The user detection module 136 may also be provided with the functionality to identify the users such that the other modules in memory 112 can retrieve the necessary data for those users.

The user presence module 140 is provided to detect presence information for users. In some embodiments, the user presence module 140 is configured to retrieve presence information for each user that is detected by the user detection module 136. In particular, the user presence module 140 may retrieve information related to whether a particular user is signed in to another user device, into a service (e.g., an IM service, a VoIP service, a P2P service, or the like), or currently in need of additional communication features. As an example, the user presence module 140 may detect that one of the users utilizing the user device 104 is currently signed into an IM service on another user device. This user's IM presence may be transferred to the shared user device 104 for as long as the user is utilizing the user device 104. This affords users with a greater flexibility in moving between user devices 104.

The memory 112 may also include a communication module, instead of one or more communication-based applications, which provides the communication functionality of the user device 104. In particular, the communication module may contain the functionality necessary to enable the user device 104 to communicate with other user devices 104 across a communication network. As such, the communication module may have the ability to access user communication preferences maintained within a locally-stored profile 144 (or remotely-stored profile), format communication packets for transmission via the network interface 168, as well as condition communication packets received at a network interface 168 for further processing by the processor 108.

In some embodiments, the data structure 144 is stored directly on the user device 104. In some embodiments, the data structure 144 may be stored by the enterprise and pushed to the user device 104 on an as-needed basis. The remote storage of the data structure 144 may occur on another user device or on a server. In some embodiments, a portion of the data structure 144 is stored locally on the user device 104 and another portion of the data structure 144 is stored at an enterprise and provided on an as-needed basis.

The network interface 168 comprises components for connecting the user device 104 to a communication network. In some embodiments, a single network interface 168 connects the user device to multiple networks. In some embodiments, a single network interface 168 connects the user device 104 to one network and an alternative network interface is provided to connect the user device 104 to another network.

The network interface 168 may comprise a communication modem, a communication port, or any other type of device adapted to condition packets for transmission across a communication network to a destination user device 104 as well as condition received packets for processing by the processor 108. Examples of network interfaces include, without limitation, a network interface card, a wireless transceiver, a modem, a wired telephony port, a serial or parallel data port, a radio frequency broadcast transceiver, a USB port, or other wired or wireless communication network interfaces.

The type of network interface 168 utilized may vary according to the type of network which the user device 104 is connected, if at all. Exemplary communication networks to which the user device 104 may connect via the network interface 168 include any type and any number of communication mediums and devices which are capable of supporting communication sessions, such as voice calls, video calls, chats, emails, TTY calls, multimedia sessions, or the like. In situations where the communication network is composed of multiple networks, each of the multiple networks may be provided and maintained by different network service providers. Alternatively, two or more of the multiple networks in the communication network may be provided and maintained by a common network service provider or a common enterprise in the case of a distributed enterprise network.

Exemplary types of communication networks include, without limitation, a Local Area Network (LAN), multiple LANs, a Wide Area Network (WAN), an enhanced IP-based network, a circuit-switched network, a Session Initiation Protocol (SIP) network, the Internet, the Public Switched Telephone Network (PSTN), a Plain Old Telephone System (POTS) network, an Integrated Serviced Digital Network (ISDN), a cellular communications network (e.g., 3G, 4G, etc.), an IP Multimedia Subsystem (IMS) network, or the like. In addition, it can be appreciated that the communication network need not be limited to any one network type, and instead may be comprised of a number of different networks and/or network types.

As can be appreciated by one skilled in the art, functions offered by the modules depicted in FIG. 1 may be implemented in one or more network devices (i.e., servers, networked user device, non-networked user device, etc.). Additionally, although N users are depicted as sharing the user device 104, one skilled in the art will appreciate that advantages of the present invention can be realized when only two users are sharing the user device 104. Moreover, "sharing" of the user device 104 does not necessarily mean that two users are physically in front of the user device 104. Rather, one user may virtually share a user device 104 by connecting to the user device 104 via the network interface 168. The user detection module 136 may be configured to detect situations where a user is virtually sharing the user device 104 and may still cause the GUI management module 116 to alter the user interface 148 to accommodate the virtual sharing of the user device 104.

Figure 2:
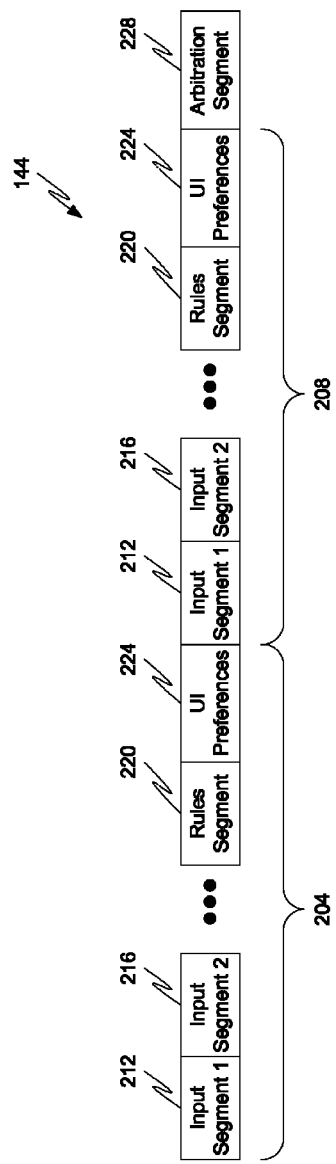
FIG. 2 is a block diagram depicting an exemplary data structure utilized in accordance with embodiments of the present invention.

An embodiment of the data structure 144 is shown in FIG. 2. The data structure 144 can be stored in several different forms of databases, such as relational databases, flat files, object-oriented databases, etc. Thus, while the term "data field" or "segment" is used, the data may be stored in an object, an attribute of an object, or some other form of data structure. Further, the data structure 144 can be stored, retrieved, sent, or received during the processing communication session information by one or more of the modules discussed herein. The data structure 144 stores one or more items of information in one or more data fields. The numeric identifiers (e.g. 212, 216, etc.) shown in FIG. 2 can identify, in one or more fields or segments, either the data field or segment or the data stored in the data field or segment.

The data structure 144 may be separated into two or more portions, although such a separation is not required. For example, the data structure 144 may comprise a portion dedicated to each user detected as sharing the user device 104. As a simple case, this may include providing a first portion 204 for a first user and a second portion 208 for a second user, where the first and second users are detected as sharing the user device 104. More portions may be created if more than two users are detected as sharing the user device 104. Each portion can include one or more input segments, such as, input segment 1 212 and input segment 2 216, a rules segment 220, and a user interface preferences segment 224. Input segments each include one or more fields comprising the one or more inputs that may be required to determine user communication preferences, user identity, user communication needs, etc. The input segments may include a user identity, a user's outbound call-processing preferences, a user's inbound call-processing preferences, a user's multimedia communication preferences, a user's roaming profile, a user's communication history, a list of contacts, etc.

While there are only two input segments shown per-portion in FIG. 2, there may be more or fewer input segments associated with the data structure 144, as indicated by the ellipses.

The rules segment 220 can include one or more heuristic rules that either help with identifying when to enable a particular module or service or controlling a module or service once invoked. For example, the rule 220 can state that the data structure 144 or a user's portion thereof applies to a communication session only if the communication session includes input segment 1 212 but not input segment 2 216. One skilled in the art will be able to identify other types of rules that may govern the association of the data structure 144 with various types of data inputs created within the system 100 (e.g., location data inputs, presence data inputs, communication activity data inputs, device operation data inputs, etc.). Accordingly, multiple data structures 144, such as those depicted in FIG. 2, may be contained within memory 112. In some embodiments, each user may have their own dedicated data structure 144 rather than sharing a single data structure 144 among multiple users.

Generally, a user interface preferences segment 224 includes a list of user interface preferences for the user. In some embodiments, the user interface preferences segment 224 defines display resolution, font type, font size, soft-key location, soft-key preferences, and the like that a user typically utilizes when they aren't sharing a user device 104 or when they are working on their main user device 104. In some embodiments, the user interface preferences segment 224 may also define the manner in which data and certain types of communications are presented to a user. For example, one user may prefer to view contact lists while using a user device 104 whereas another user may prefer to view call histories while using a user device 104. Any and all such user interface preferences may be provided as rules within the user interface preferences segment 224.

The data structure 144 may further contain an arbitration segment 228 which provides rules for arbitrating between inconsistencies in each user's user interface preferences segment 224. In some circumstances, it may be impossible for a user interface 148 to accommodate two user's display preferences simultaneously. This is where the arbitration segment 228 is referenced by the GUI management module 116 to determine exactly how the user interface 148 should be manipulated. In some embodiments, the arbitration segment 228 may provide rules which define that a particular user's display preferences should be given priority over another user's display preferences. In some embodiments, the arbitration segment 228 may provide rules which define that a lowest common preference or default preference should be used in the event of inconsistent preferences. The arbitration rules contained within the arbitration segment 228 may be as simple or as complex as desired to accommodate an efficient sharing of the user device 104 by multiple users.

Figure 3:
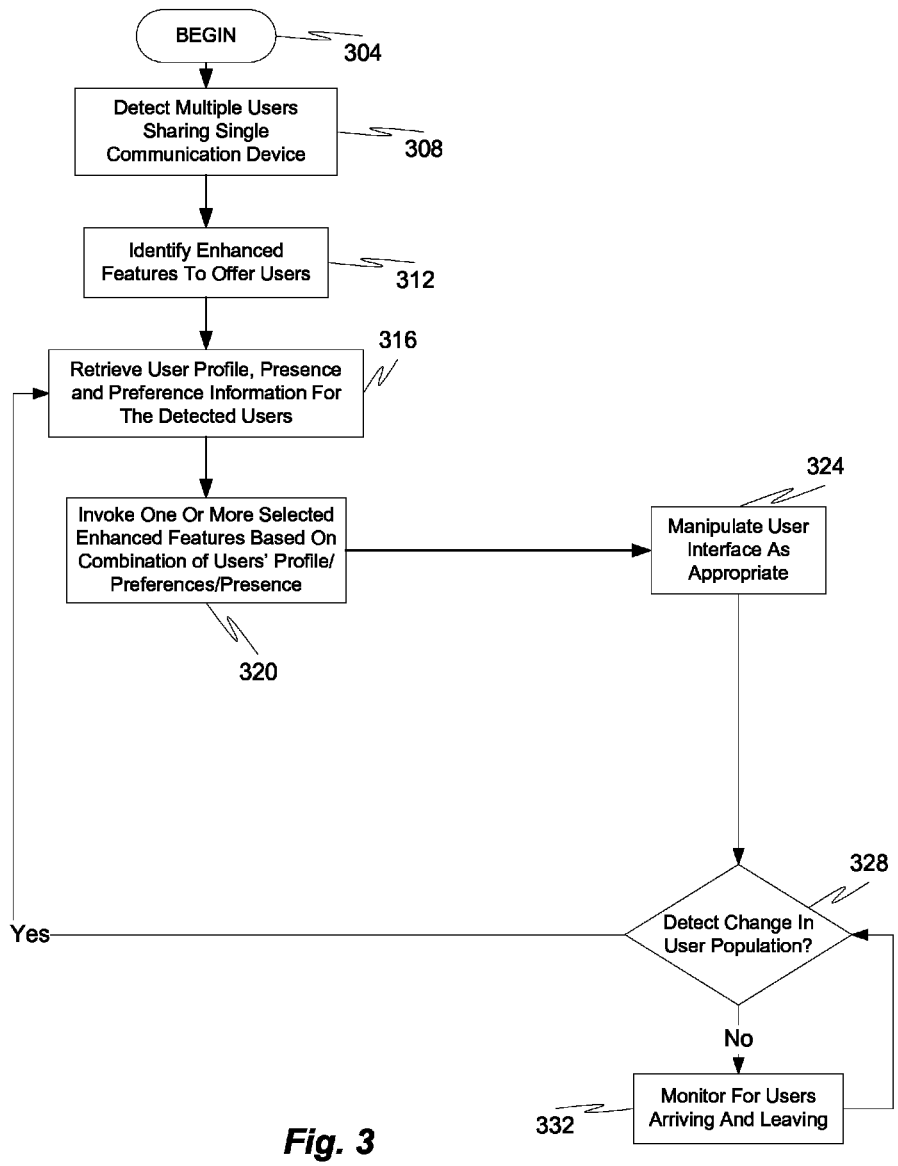
FIG. 3 is a flow diagram depicting an exemplary user interface control method in accordance with embodiments of the present invention.

With reference now to FIG. 3, an exemplary method of controlling a user interface 148 will be described in accordance with at least some embodiments of the present invention. The method begins at step 304 and continues when the user detection module 136 detects that two or more users are sharing the user device 104 (step 308). The user detection module 136 may also determine the identities of the users, if possible, within this step. The detection step may include detecting that two or more users are within proximity of the user device 104 (i.e., a predefined distance away from the user device) via RFID, SIM card, or facial recognition mechanisms. Alternatively, or in addition, the detection step may include detect that one or more users are attempting to virtually share resources of the user device 104 with another user who is also using physical resources of the user device 104. One or more of the sharing users do not necessarily have to be within physical proximity of the user device 104.

Based on the detection of multiple users, and possibly based on the identities of the users as well, the method continues with the multi-user enhanced feature module 124 determining if any enhanced or advanced features are to be offered to the users while the user device 104 is being shared (step 312). This step may involve querying the users via the user interface 148 as to whether or not a shared user interface functionality is desired. In some embodiments, the determination of step 312 is performed automatically rather than asking for a user response before invoking the enhanced features of the present disclosure.

Thereafter, the user profile and preference retrieval module 132 and user presence module 140 are invoked such that each detected and identified user's profile, presence, and/or preference information is retrieved (step 316). Again, this step may be performed automatically if the modules 132, 140 know where such data can be obtained, have already been provided such data, or the like. However, this step may also be implemented with manual assistance by asking each user for their profile, presence, and/or preference information or by asking each user for where such data can be obtained.

All of the data obtained for each user is then utilized to construct the data structure(s) 144 that can be used by the other modules contained within memory 112. In particular, one or more of the GUI management module 116, special communication needs module 120, multi-user enhanced feature module 124, and data presentation enhancement module 128 may be invoked to provide enhanced user interface features according to the combinations of the users' profile, presence, and/or preferences (step 320). This typically involves manipulating the user interface 148 according to the rules in the data structure 144 (step 324). In particular, the GUI of the user interface 148 may be automatically altered to accommodate the sharing of the user device 104 by multiple users. In a relatively simple embodiment where two users are detected as sharing the user device 104, the toggle input 164 may be displayed along with a single user-specific display area 156*a*. The toggle input 164 may provide an option to toggle between a user-specific display area for the first user and a user-specific display area for the second user. Of course, the manipulation of the user interface 148 may be more complex and is not limited to the specific examples described herein. The manipulation of the user interface to accommodate a sharing of the user device 104 may continue for as long as the user device 104 is being shared. Certain environmental inputs, user inputs, and other actions (e.g., incoming calls, outbound calls, receiving text messages for one user but not the other, etc.) may cause the GUI management module 116 and the other modules in memory 112 to continually and dynamically update user interface 148. For example, an outbound call placed via the user device 104 while the user device 104 is being shared may result in each user's call history to be updated to display the new outbound call.

The user detection module 136 continues to monitor the user device 104 to determine if there has been a change in the user population that is sharing the user device 104 (step 328). If such a change is not detected, then the user detection module 136 will again check the utilization of the user device 104 to determine if new users have arrived or previous users have left (step 332). Once such a change is detected, the method returns back to step 316. Alternatively, although not depicted, the method may return to step 312 instead of step 316.

If the determination of step 328 results in the user detection module 136 determining that only one user is using the user device 104, then the display preferences for that single user will define how the user interface 148 is manipulated. Otherwise, the user interface 148 will be altered to accommodate a sharing of the user device 104.

Moreover, the monitoring and detecting step 328 and 332 may still be performed after the user device 104 is no longer being shared. This continuous monitoring allows the user detection module 136 to quickly identify when the user device 104 is being shared and react accordingly, thereby reducing the amount of delay between the time when users begin sharing the user device 104 and when the user interface 148 is altered for the multiple users.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the invention have been described in detail herein, it is to be understood that the inventive concepts may be otherwise variously embodied and employed, and that the appended claims are intended to be construed to include such variations, except as limited by the prior art.

What is claimed is:

1. A method, comprising:
   detecting two or more users sharing a first user device, and, wherein, detecting two or more users sharing a user device comprises:
   detecting that one of the users sharing the first user device is simultaneously using a second user device;
   transferring a communication presence associated with the user simultaneously using the second user device from the second user device to the first user device; and
   in response to detecting the two or more users sharing the first user device, altering a property of a user interface of the first user device to accommodate a simultaneous use of the first user device by the detected two or more users, wherein altering a property of the user interface comprises altering a display of data via the user interface, wherein altering a display of data via the user interface comprises presenting at least some data specific to a first user according to the first user's display preferences and presenting at least some data specific to a second user according to the second user's display preferences, and, wherein altering a display of data via the user interface comprises:
   retrieving a first set of data associated with the first user;
   retrieving a second set of data associated with the second user;
   merging the first set of data with the second set of data; and
   presenting the merged data via the user interface.

2. The method of claim 1, wherein detecting two or more users sharing the first user device comprises detecting two or more users within proximity of the user device.

3. The method of claim 2, wherein the two or more users are detected by at least one of facial recognition, SIM card detection, RFID detection, and detection of a combined user login.

4. The method of claim 1, wherein the first user's display preferences are different from the second user's display preferences.

5. The method of claim 1, wherein the first set of data comprises a contact list of the first user and wherein the second set of data comprises a contact list of the second user, wherein each user's contact list is different, and wherein the merged data comprises at least the commonalities between each user's contact list.

6. The method of claim 5, wherein the merged data comprises only the commonalities between each user's contact list.

7. The method of claim 1, wherein the first set of data comprises a first document, wherein the second set of data comprises a second document, and wherein the merged data comprises a merged version of the first and second document.

8. The method of claim 1, further comprising:
retrieving at least one of user profile, user presence, and user preference information for the two or more users;
constructing a data structure that includes the information retrieved for the two or more users; and
presenting data via the user interface in accordance with the data structure.

9. A non-transitory computer-readable medium having stored thereon instructions that cause a computing system to execute a method, the instructions comprising:
instructions configured to detect two or more users sharing a first user device;
instructions configured to alter a property of a user interface of the first user device to accommodate the simultaneous use of the first user device by the detected two or more users, wherein the two or more users comprise a first user and a second user, wherein altering a property of the first user interface comprises combining at least some data associated with the first user with at least some data associated with the second user and presenting the combined data via the user interface;
instructions configured to detect that one of the users sharing the first user device is simultaneously using a second user device; and
instructions configured, in response to detecting that one of the users sharing the first user device is simultaneously using a second user device, to transfer a communication presence associated with the user simultaneously using the second user device from the second user device to the first user device.

10. The non-transitory computer-readable medium of claim 9, wherein detecting two or more users sharing the user device comprises detecting two or more users within proximity of the user device.

11. The non-transitory computer-readable medium of claim 9, wherein altering a property of the user interface comprises altering a display of data via the user interface and wherein altering a display of data via the user interface comprises presenting at least some data specific to a first user according to the first user's display preferences and presenting at least some data specific to a second user according to the second user's display preferences.

12. The non-transitory computer-readable medium of claim 9, wherein altering a property of the user interface comprises dynamically generating a toggle input that allows the two or more users to manually alter the user interface to accommodate sharing of the user device.

13. The non-transitory computer-readable medium of claim 9, wherein the two or more users comprise a first user and a second user, wherein altering a property of the user interface comprises allocating a first area of the user interface for presenting data for a first user and allocating a second area of the user interface for presenting data for a second user.

14. A user device, comprising:
a user interface;
a user detection module configured to detect two or more users sharing a first user device, wherein, the user detection module is further configured to detect that one of the users sharing the first user device is simultaneously using a second user device; and
a user interface management module configured to alter a property of the user interface to accommodate the simultaneous use of the first user device by the detected two or more users, the two or more users including a first user and a second user, wherein the user interface management module is configured to alter the property of the user interface by combining at least some data associated with the first user with at least some data associated with the second user and presenting the combined data via the user interface, wherein the user interface management module is further configured to transfer a communication presence associated with the user simultaneously using the second user device from the second user device to the first user device.

15. The user device of claim 14, wherein the two or more users are virtually sharing the first user device.

16. The user device of claim 14, wherein the two or more users are physically sharing the first user device.

* * * * *